US010267680B1

(12) United States Patent
Shields

(10) Patent No.: US 10,267,680 B1
(45) Date of Patent: *Apr. 23, 2019

(54) SYSTEM FOR OUTPUTTING A SPECTRUM OF LIGHT OF A SCENE HAVING OPTICAL DETECTORS TO RECEIVE LIGHT OF DIFFERENT SPECTRAL TRANSMITTANCE FROM RESPECTIVE FILTERS

(71) Applicant: National Technology and Engineering Solutions of Sandia, LLC, Albuquerque, NM (US)

(72) Inventor: Eric A. Shields, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/590,783

(22) Filed: May 9, 2017

Related U.S. Application Data

(60) Provisional application No. 62/363,518, filed on Jul. 18, 2016.

(51) Int. Cl.
*G02B 27/42* (2006.01)
*G01J 3/28* (2006.01)
*G01J 3/26* (2006.01)
*G01J 3/12* (2006.01)

(52) U.S. Cl.
CPC ............... *G01J 3/2823* (2013.01); *G01J 3/26* (2013.01); *G01J 2003/1213* (2013.01); *G01J 2003/283* (2013.01)

(58) Field of Classification Search
CPC ......... G09G 2320/0209; G09G 3/3607; G01N 21/031; G01N 21/0303; G01N 21/4795; A61B 5/1455; G01J 3/26; G01J 3/42; H01L 27/14621; H01L 31/02162
USPC ........................................................ 250/226
See application file for complete search history.

(56) References Cited

U.S. PATENT DOCUMENTS 6,171,885 B1 * 1/2001 Fan .................... H01L 27/14609
257/E27.132
10,120,195 B1 * 11/2018 Bossed .............. G02B 27/1066

OTHER PUBLICATIONS

August I., et al., "Miniature Compressive Ultra-Spectral Imaging System Utilizing a Single Liquid Crystal Phase Retarder", In Scientific Reports, Mar. 23, 2016, 9 pages.

(Continued)

*Primary Examiner* — Que Tan Le
(74) *Attorney, Agent, or Firm* — Medley, Behrens & Lewis, LLC; Samantha Updegraff

(57) ABSTRACT

Technologies pertaining to a compressive sensing snapshot spectrometer are described herein. Light is focused through an array of filters onto an array of optical detectors by way of an optical objective. Each detector in the array receives light from a single respective filter in the filters. Each filter in the filters has a spectral transmittance function that overlaps a spectral transmittance function of at least one other filter. A compressive sensing algorithm is executed over outputs of the detectors based upon the known spectral transmittance functions of the filters. Based upon the execution of the compressive sensing algorithm, intensity values of the light are identified for a number of spectral bins that is greater than a number of detectors in the array.

20 Claims, 7 Drawing Sheets

(56) References Cited

OTHER PUBLICATIONS

August Y., et al., "Compressive Sensing Spectroscopy Based on Liquid Crystal Devices", In Optics Letters, vol. 38, No. 23, Dec. 1, 2013, pp. 4996-4999.
Baraniuk, Richard G., "Compressive Sensing", In IEEE Signal Processing Magazine, Jul. 2007, pp. 118-124.
Moler, Cleve, ""Magic" Reconstruction: Compressed Sensing", In MathWorks News&Notes, 2010, pp. 1-4.
Oiknine, et al., "Compressive Sensing Resonator Spectroscopy", In Optics Letters, vol. 42, No. 1, Jan. 1, 2017, pp. 25-28.

* cited by examiner

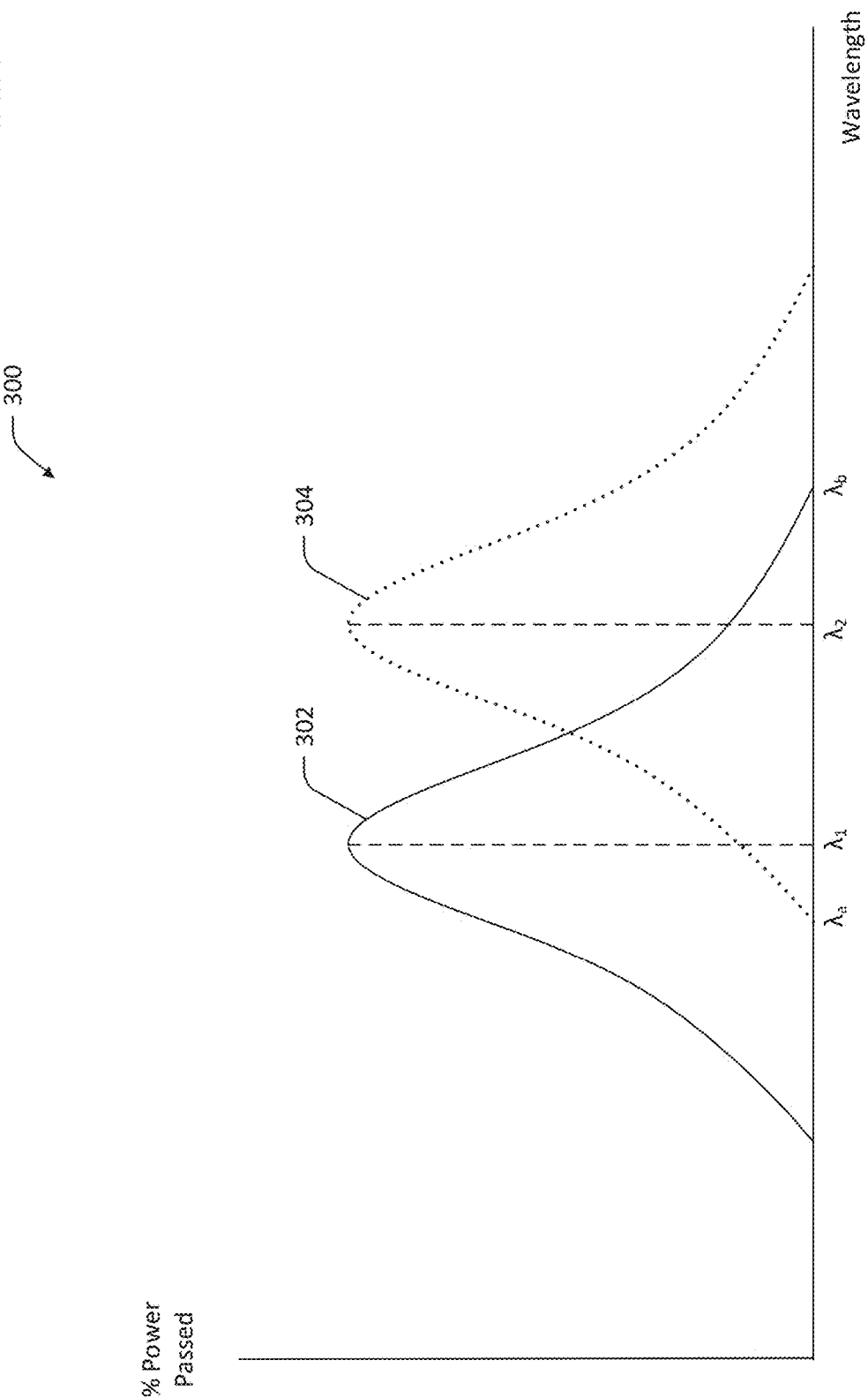

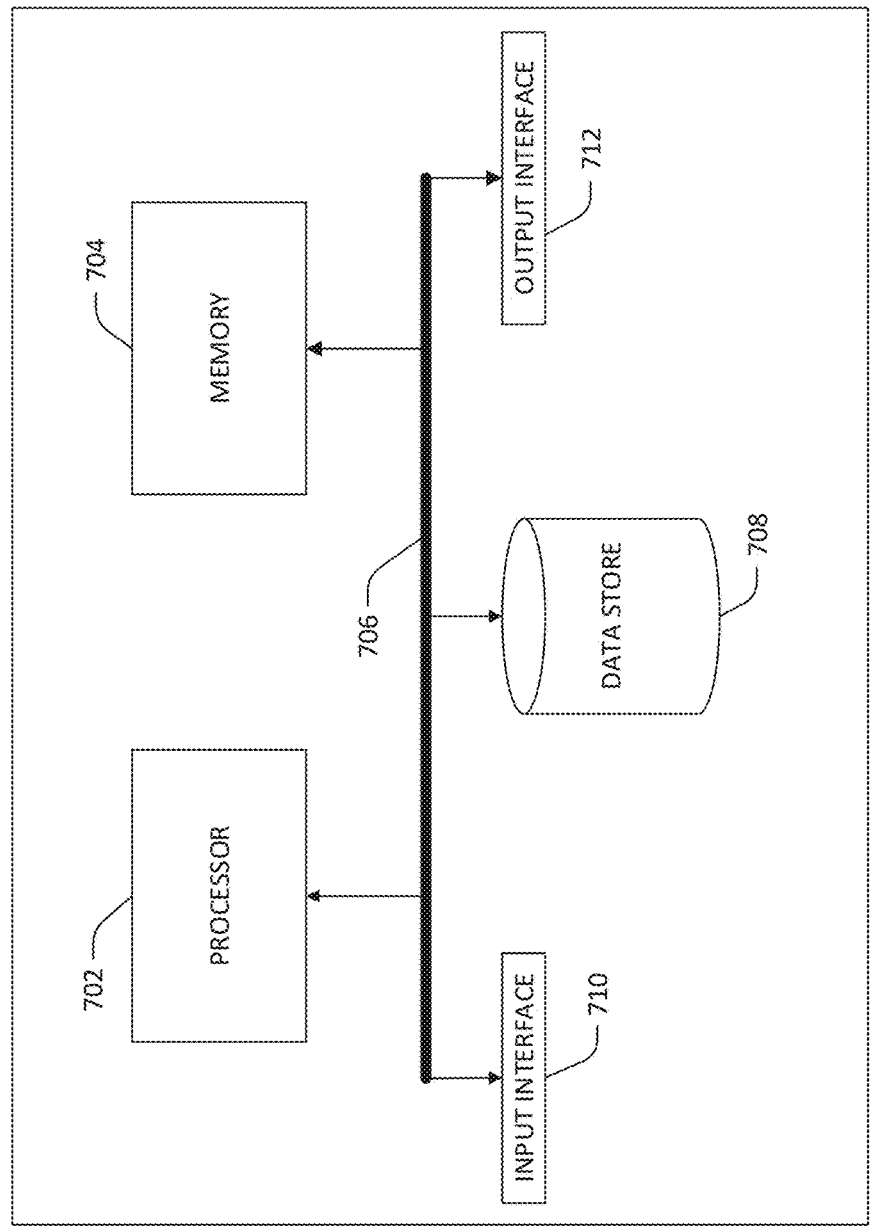

SYSTEM FOR OUTPUTTING A SPECTRUM OF LIGHT OF A SCENE HAVING OPTICAL DETECTORS TO RECEIVE LIGHT OF DIFFERENT SPECTRAL TRANSMITTANCE FROM RESPECTIVE FILTERS

RELATED APPLICATIONS

This Application claims priority to U.S. Provisional Patent Application No. 62/363,518, filed on Jul. 18, 2016, and entitled "COMPRESSIVE SENSING SNAPSHOT SPECTROMETER", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Spectrometers are used in a variety of remote sensing applications to determine emission spectra of objects or regions of interest. In these applications, users of spectrometers are often interested in a plurality of spectral bands, or frequency ranges. Conventional pixelated spectrometers generally do not allow spectral data to be collected for more than a handful (e.g., three or four) of spectral bands, and generally require separate filtering and detecting components for each spectral band for which data is to be collected. Compressive sensing techniques have been developed that allow information to be collected for multiple spectral bands using a single detector that receives light by way of a configurable filter, but these techniques require multiple measurements to be made over a period of time as a spectral transmittance of the filter is varied between measurements. Thus, conventional spectrometers cannot provide "snapshot" capability to nearly instantaneously collect data for a large number of spectral bands (e.g., tens of bands of tens of nanometers) simultaneously.

SUMMARY

The following is a brief summary of subject matter that is described in greater detail herein. This summary is not intended to be limiting as to the scope of the claims.

Disclosed herein are various technologies pertaining to a compressive sensing snapshot spectrometer. In an exemplary embodiment, emitted or reflected light is received from an object or region of interest by way of an optical objective that comprises one or more optical elements (e.g., lenses, mirrors, etc.). The received light is directed to an array of optical filters by the objective. Each of the optical filters in the array of filters has a different spectral transmittance function that overlaps with the spectral transmittance function of at least one other filter in the array. The array of filters can be tiled so that a first group of filters in the array has a same first field of view and a second group of filters in the array has a same second field of view. Filters at corresponding locations in the first group and the second group can have the same spectral transmittance functions. Each of the optical filters in the array has a corresponding optical detector that receives light from its filter and outputs an electrical characteristic (e.g., voltage, charge, current, etc.) or data indicative of an intensity of the light received from the filter.

A computing system receives the data indicative of the intensity of the light received for each of the detectors in the array of detectors. The computing system executes compressive sensing algorithms over the data to identify a spectrum of the light received by way of the objective. The spectrum comprises intensity values for a plurality of spectral "bands" (e.g., ranges of wavelengths of light). For example, the spectrum can include separate bands for visible red light, visible blue light, ultraviolet light, infrared light, etc. In an example, the spectrum identified based upon the execution of the compressive sensing algorithms can include a greater number of spectral bands than a number of filters in the array of filters.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 is a graph of exemplary spectral transmittance functions of optical filters in an exemplary compressive sensing snapshot spectrometer.

FIG. 7 is an exemplary computing system.

DETAILED DESCRIPTION

Figure 1:
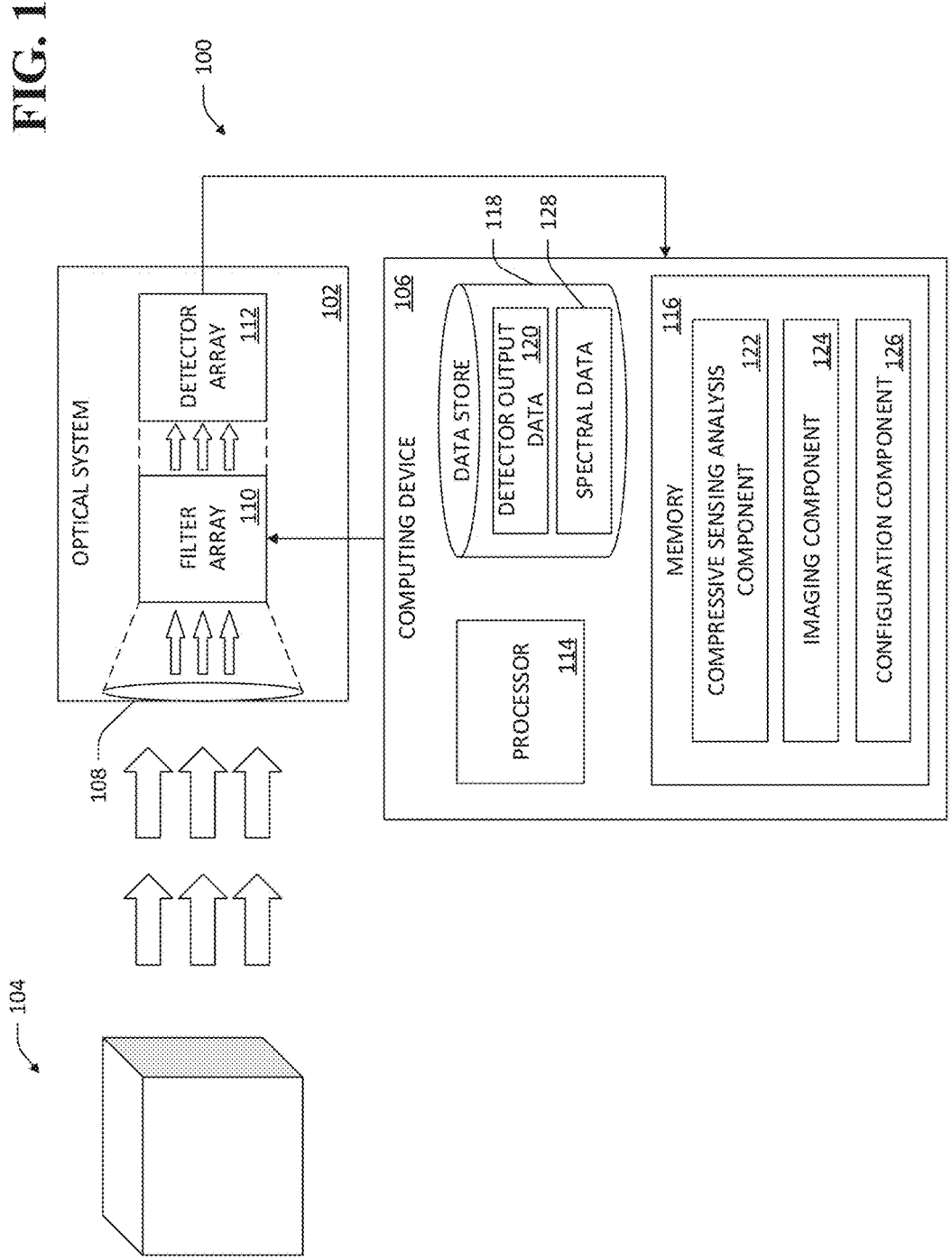
FIG. 1 is a functional block diagram of an exemplary system that facilitates snapshot compressive sensing spectrometry.

Various technologies pertaining to a snapshot spectrometer that identifies spectral characteristics of received light based upon compressive sensing are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates spectral imaging of a scene by way of a compressive sensing snapshot spectrometer is illustrated. The system 100 includes an optical system 102 that receives light from a scene 104 and a computing device 106 in communication with the optical system. The computing device 106 processes data received from the optical system 102 in order to generate spectral images of the scene 104.

The optical system 102 receives light from the scene 104 by way of an imaging objective 108. The light received by way of the imaging objective 108 is generally broadband light that has components across a broad range of the electromagnetic spectrum. For example, the broadband light can include spectral components that span the visible light spectrum, or the broadband light can include spectral components spanning from the ultraviolet range to the infrared range. The optical system 102 further includes an optical filter array 110 that receives light from the imaging objective 108, and an optical detector array 112 that receives the light after it passes through the filters in the filter array 110. The imaging objective 108 focuses the light such that an image of the scene is in focus at a surface of the detector array 112. The imaging objective 108 comprises one or more optical elements such as mirrors, lenses, etc., which are configured to focus the light at the detector array 112.

The filter array 110 and the detector array 112 are matched arrays such that each filter in the filter array 110 corresponds to a different, single detector in the detector array 112. Each detector in the detector array 112 receives light from its corresponding filter in the filter array 110. In an example, the filter array 110 and the detector array 112 can be square arrays of 64 filters and 64 detectors, respectively. In other examples, the arrays 110, 112 can be square arrays of between 16 and 400 detectors and filters.

Figure 2B:
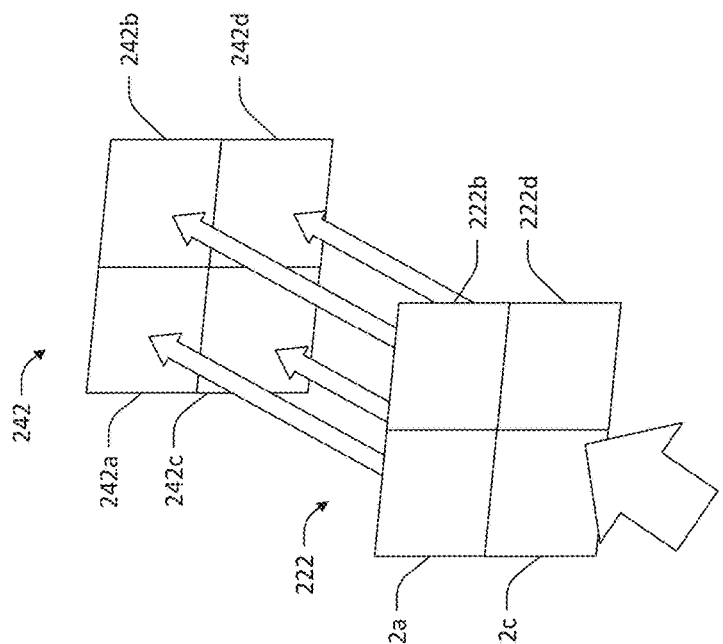
FIGS. 2A and 2B are diagrams of exemplary arrays of optical filters and optical detectors for snapshot compressive sensing spectrometry.
Figure 2A:
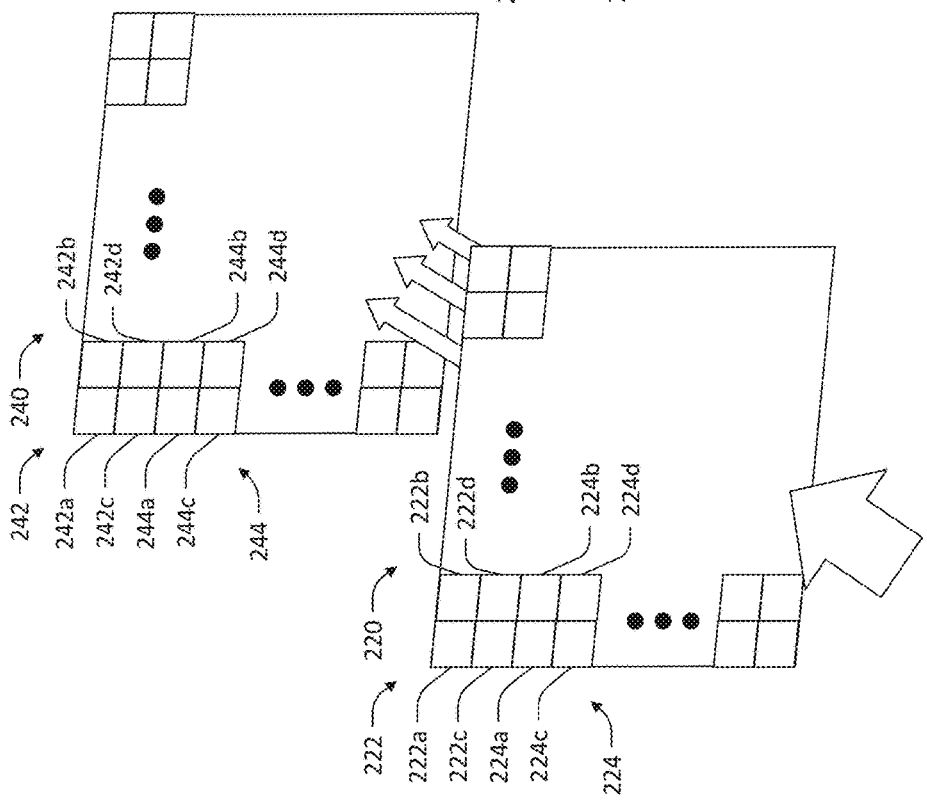

Referring now to FIGS. 2A-2B, an exemplary array of optical filters 220 and an exemplary array of optical detectors 240 are illustrated, wherein detectors in the array of detectors 240 receive light that passes through filters in the array of filters 220. The array of filters 220 comprises a plurality of optical filters with varying spectral transmittance functions. The array of detectors 240 comprises a plurality of optical detectors. Each of the optical detectors in the array of detectors 240 receives light that passes through one of the filters in the array of filters 220. For example, referring to FIG. 2B, light passes through a first group 222 of filters 222a-222d and strikes a first group 242 of detectors 242a-242d. Each of the detectors 242a-242d receives light from a different single filter in the filters 222a-222d. The detectors 242a-242d each receive light from a filter at a corresponding location in the filter array 222. By way of example: the detector 242a in the upper-most left corner of the detector array 240 receives light from the filter 222a in the upper-most left corner of the filter array 220; the detector 242b in a second column and first row of the array 240 receives light from the filter 242b in a second column and first row of the array 220; the detector 222c in a first column and second row of the array 240 receives light from the filter 242c in a first column and second row of the array 220, etc.

Filters in the filter array 110 pass light in wavelength bands according to each filter's respective spectral transmittance function. The spectral transmittance functions of the filters in the filter array 110 are relatively wide, such that the spectral transmittance function of each filter in the array 110 overlaps the spectral transmittance function of at least one other filter in the array 110. In an exemplary embodiment, spectral transmittance functions of filters in the filter array 110 are fixed at the time of fabrication of the filters. For example, the filters can comprise a form birefringent material. In other exemplary embodiments, the filters in the filter array 110 can be configurable filters such that a spectral transmittance function of each filter in the array 110 can be modified in response to a control signal. For example, the filters in the array 110 can be liquid crystal phase retarders, wherein spectral transmittance functions of the liquid crystal phase retarders can be modified by application of a voltage to the liquid crystal phase retarders. In another example, the filters in the array 110 can be Fabry-Perot filters, wherein a spectral transmittance function of a Fabry-Perot filter is modified by application of a control signal to a piezo-electric device that controls a distance between two mirrors in the Fabry-Perot filter.

Each of the detectors in the detector array 112 comprises a device that outputs an electrical characteristic or data indicative of an intensity of the light incident on a surface of the detector. The detectors in the array 112 can be, for example, charge-coupled devices (CCDs), elements of a focal plane array (FPA), etc. Thus, each detector in the detector array 112 has an output indicative of an intensity of light received by way of the objective 108 for various spectral bands as determined by a spectral transmittance function of the detector's corresponding filter. In embodiments in which the detectors in the detector array 112 output an electrical characteristic (e.g., a voltage, a charge, a current, etc.) indicative of the intensity of the light, the detector array 112 can further comprise circuitry configured to output data indicative of the intensity of the light based upon the electrical characteristic output by the detectors. For example, the detector array 112 can include analog-to-digital converters (ADCs) that sample voltages output by the detectors and output digital values indicative of the voltages.

The detector array 112 is in communication with the computing device 106, which receives the data indicative of the intensity of the light received by each detector in the detector array 112. It is to be understood that the detector array 112 can be in communication with the computing device 106 by way of a transmission line, a trace on a circuit board, a wireless communication link, or other means of communicating computer-readable data. For example, the detector array 112 can be in communication with the computing device 106 by providing the computing device 106 with a computer-readable storage medium comprising detector output data generated by the detector array 112. The computing device 106 comprises a processor 114 and memory 116 comprising instructions that are executed by the processor 114. The computing device 106 further comprises a data store 118 that can store the data received from the detector array 112 as detector output data 120 for later processing. The memory 116 comprises a compressive sensing analysis component 122, an imaging component 124, and a configuration component 126.

The computing device 106 executes the compressive sensing analysis component 122 after receiving the detector output data 120 from the detector array 112. In an exemplary embodiment, the computing device 106 can wait to execute the compressive sensing analysis component 122 until detector output data for an entire data collection period is received. The compressive sensing analysis component 122 executes compressive sensing algorithms over the detector output data 120. The compressive sensing analysis component 122 outputs data indicative of a spectrum of the light received by way of the objective 108 based upon the execution of the compressive sensing algorithms over the detector output data 120. The compressive sensing analysis component 122 identifies components of the spectrum of the light received by way of the objective 108 based upon known spectral transmittance functions of the filters of the filter array 110 and the detector output data 120. Filters of the filter array 110 corresponding to detectors for a same pixel in a spectral image have at least partially overlapping spectral transmittance functions.

For example, and referring now to FIG. 3, a graph 300 of exemplary spectral transmittance functions 302, 304 for two filters is shown. In the graph 300, a percent of the power of light that is passed by a filter is shown as a function of wavelength. As shown, a first filter that has the spectral transmittance function 302 passes a greatest percent of light at a wavelength of $\lambda_1$, and passes a continuously smaller percent of light at wavelengths less than $\lambda_1$ and wavelengths greater than $\lambda_1$. A second filter that has the spectral transmittance function 304 passes a greatest percent of light at a wavelength of $\lambda_2$ and passes a continuously smaller percent of light at wavelengths less than $\lambda_2$ and wavelengths greater than $\lambda_2$. The spectral transmittance functions overlap from wavelengths $\lambda_a$ to $\lambda_b$. As shown with respect to the spectral transmittance functions 302 and 304, the filters of the filter array 110 can have spectral transmittance functions that are continuous.

While the exemplary spectral transmittance functions 302-308 shown in FIG. 3 have shapes similar to a bell curve, it is to be understood that spectral transmittance functions of filters in the filter array 110 can have substantially any continuous shape. In exemplary embodiments described in greater detail below, every filter in a group of filters that corresponds to a same pixel location in a spectral image (i.e., a same field of view) has a spectral transmittance function that overlaps with the spectral transmittance function of at least one other filter in the group. In some exemplary embodiments, spectral transmittance functions of the filters in the filter array 110 are configurable responsive to control signals from the computing device 106 or other control devices. For example, if the filters in the filter array 110 are liquid crystal phase retarders, the configuration component 126 of the computing device 106 can transmit control data to supporting circuitry of the filter array 110, wherein the control data causes the supporting circuitry to vary a voltage that controls the spectral transmittance of the filters.

The compressive sensing analysis component 122 can identify the intensity of the light received by way of the imaging objective 108 for a plurality of spectral "bins", wherein a spectral bin is a range of wavelengths. In conventional spectrometers, as noted above, a single filter-detector pair can determine intensity of light in only a single bin. For example, a filter in a conventional spectrometer can be configured to pass only blue light having wavelengths between 450 nm and 495 nm. A matching detector in the conventional spectrometer would output data indicative of the intensity of the blue light in the passed wavelengths. The conventional filter-detector pair is only capable of indicating a single intensity value of light in the range 450 nm to 495 nm—in other words the conventional filter-detector pair only provides data for one spectral bin. By contrast, the compressive sensing analysis component 122 can identify an intensity of the light received by way of the imaging objective 108 for a number of spectral bins that is greater than a number of filter-detector pairs in the filter array 110 and detector array 112. For example, the compressive sensing analysis component 122 can identify an intensity of the light received by way of the imaging objective 108 for between two and ten spectral bins for each filter-detector pair. The compressive sensing analysis component 122 can store data indicative of the spectrum of the light received by way of the imaging objective 108 as spectral data 128 in the data store 118. The spectral data 128 can comprise intensity values of the light for each of a plurality of spectral bins. A size and number of the spectral bins in the spectral data 128 depends at least in part upon the spectral transmittance functions of the filters in the filter array 110 and the number of filters in the filter array 110. In an exemplary embodiment, each spectral bin has a width of between 10 nm and 100 nm. In another exemplary embodiment, each spectral bin has a width of between 20 and 80 nm. In still another exemplary embodiment, each spectral bin has a width of between 30 and 60 nm.

In an embodiment, the filter array 110 and the detector array 112 can be tiled arrays, such that the arrays 110, 112 comprise groups of paired filters and detectors, respectively. The optical elements of the imaging objective 108 and the arrays 110, 112 can be arranged such that filters and detectors in a first group of filters and detectors have a substantially same first field of view whereas filters and detectors in a second group of filters and detectors have a substantially same second field of view. The compressive sensing analysis component 122 can identify a plurality of spectra wherein each spectrum in the spectra corresponds to a different field of view, and wherein each spectrum comprises intensity data for a plurality of spectral bins.

Referring again to FIGS. 2A-2B, the filters in the array of filters 220 and the detectors in the array of detectors 240 are arranged in paired groups of filters and detectors, wherein filters and detectors in the same paired group have a same field of view. For example, a first group of filters 222 in the array of filters comprises the filters 222a-222d, all having a substantially same first field of view that is shared by a first group of detectors 242a-242d. A second group of filters 224 comprises filters 224a-224d all having a substantially same second field of view that is shared by a second group of detectors 244a-244d. The filters in a group of filters each have a different spectral transmittance function. Thus, each filter in a group of filters passes a different amount of light in each of a plurality of spectral bands. The spectral transmittance function of each filter in a group of filters overlaps with the spectral transmittance function of at least one other filter in the group of filters.

The compressive sensing analysis component 122 receives outputs of the detectors 242a-242d and 244a-244d and identifies a spectrum for each of the first and second fields of view. The compressive sensing analysis component 122 generates spectral data for the first field of view based upon execution of compressive sensing algorithms over the outputs of the detectors 242a-242d. The compressive sensing analysis component 122 generates spectral data for the second field of view based upon execution of the compressive sensing algorithms over the outputs of the detectors 244a-244d. In an exemplary embodiment, the spectral transmittance functions of the filters in the filter array 110 are repeated from group to group. By way of example, in the exemplary filter groups 222 and 224, filters corresponding to a same location in each group have a same spectral transmittance function. Thus, in the exemplary embodiment, filter 222a has a same spectral transmittance function as filter 224a, filter 222b has a same spectral transmittance function as filter 224b, etc. When the spectral transmittance functions of the filters are repeated from group to group, the compressive sensing analysis component 122 can identify spectral data for a same set of spectral bins for each field of view.

The imaging component 124 of the computing device 106 can generate spectral images from the spectral data generated by the compressive sensing analysis component 122. The imaging component 124 can store spectral images in the data store 118 as part of the spectral data 128 for later display by the computing device 106 or other computing devices. The imaging component 124 generates spectral images based upon spectra identified by the compressive sensing analysis component 122 for a plurality of groups of filter-detector pairs in the arrays 110, 112. By way of example, each group of filter-detector pairs having a same field of view corresponds to a pixel of a spectral image. Referring again to FIG. 2A, the compressive sensing analysis component 122 identifies a first spectrum of light for a first field of view corresponding to the first group of detectors 242 and a second spectrum of light for a second field of view corresponding to the second group of detectors 244. The imaging component 124 generates a spectral image wherein a first pixel in the spectral image is based upon the first spectrum of light and a second pixel in the spectral image is based upon the second spectrum of light. The spectral image generated by the imaging component 124 includes a different pixel for each of the groups of detectors in the detector array 112.

Figure 4:
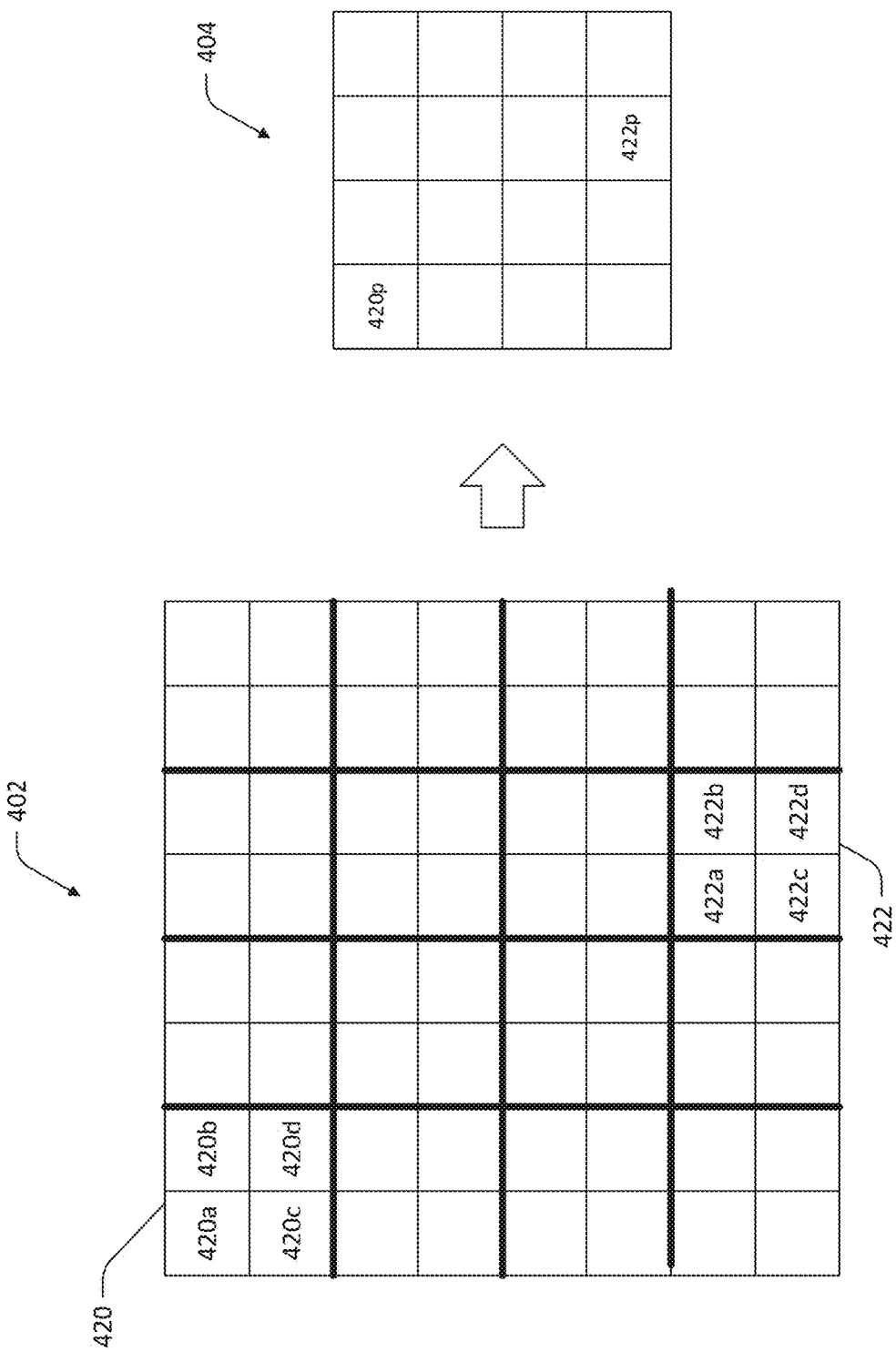
FIG. 4 is a diagram of a mapping of an exemplary array of optical detectors to pixels of an exemplary spectral image.
Figure 5:
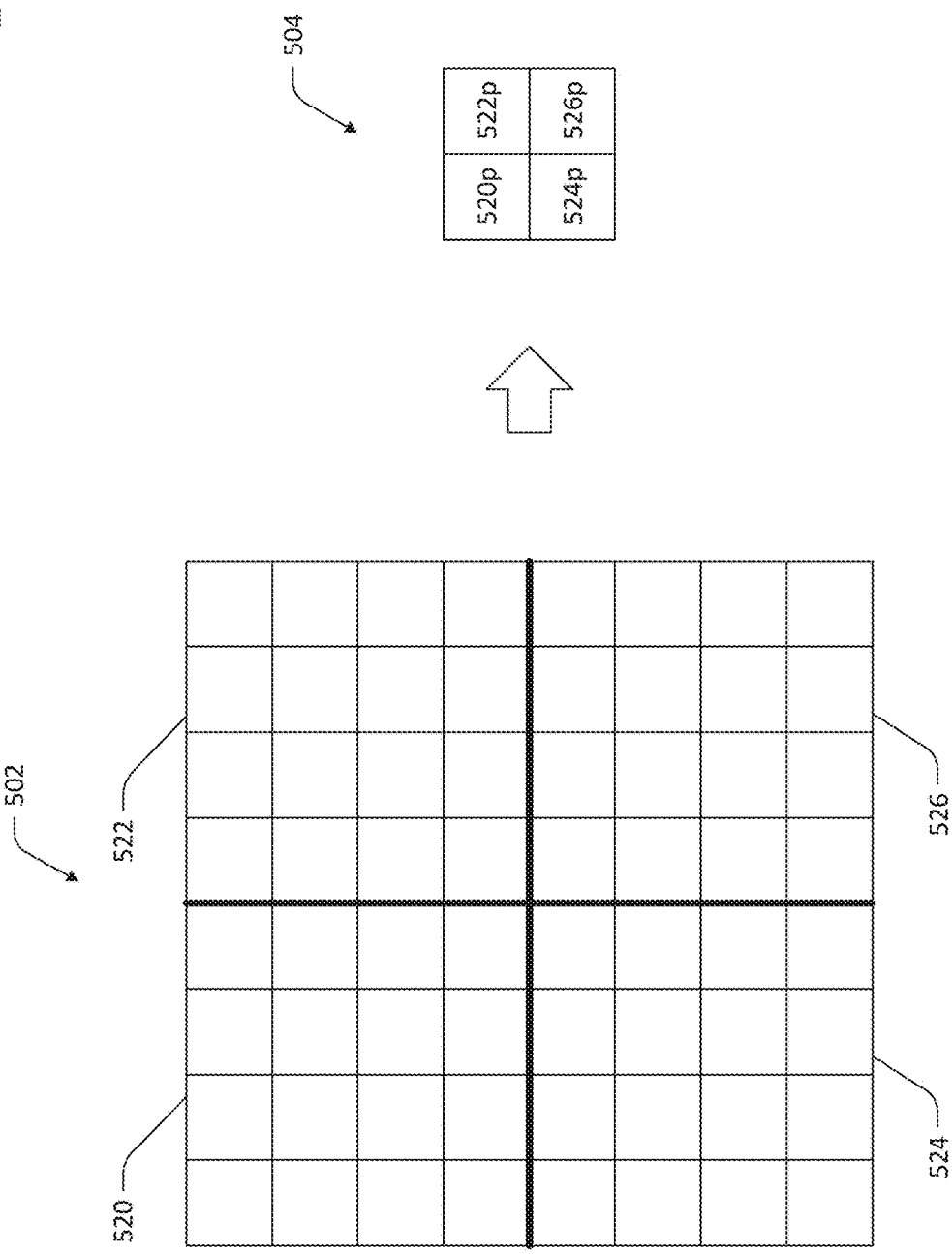
FIG. 5 is a diagram of a mapping of another exemplary array of optical detectors to pixels of another exemplary spectral image.

Referring now to FIGS. 4 and 5, diagrams of exemplary detector arrays and spectral images are shown that illustrate how spatial resolution may be traded for spectral resolution in spectral images generated by the system 100. For an array of detectors that has a fixed size, generally the larger the number of detectors in a group corresponding to a pixel in a spectral image, the greater will be the spectral resolution of each pixel in the spectral image and the lower will be the spatial resolution of the spectral image.

Referring to FIG. 4, an exemplary array 402 of optical detectors is illustrated wherein outputs of the array 402 of detectors are used to generate a spectral image 404 comprising a plurality of pixels. The exemplary array 402 is an 8×8 array of optical detectors separated into 4×4 groups of 2×2 detectors each. Within each group of detectors, the detectors have a same field of view. In an exemplary embodiment, no two groups of detectors in the array 402 have the same field of view. The groups of detectors in the array 402 thus correspond to pixels at corresponding locations in the image 404, wherein each pixel in the image 404 comprises data indicative of a spectrum of light received from a different field of view. Thus, for example, outputs of an upper-leftmost group 420 of detectors 420a-420d are used to generate spectral data for an upper-leftmost pixel 420p. Likewise, outputs of a group 422 of detectors 422a-422d in a fourth row and third column in the 4×4 groups are used to generate spectral data for a pixel 422p in a fourth row and third column in the pixels of image 404. Each of the 4×4 groups of detectors in the array 402 corresponds to a different pixel in the spectral image 404. Thus, a number of pixels in the spectral image 404 depends upon a number of groups of detectors in the array 402.

Referring to FIG. 5, an array 502 of 8×8 detectors is illustrated wherein outputs of the array 502 are used to generate a spectral image 504 comprising a plurality of pixels. In the array 502, the 8×8 detectors are separated into 2×2 groups 520, 522, 524, 526 of 4×4 detectors each. The spectral image 504 has 2×2 pixels 520p, 522p, 524p, 526p, each pixel corresponding to a respective group of detectors in the groups 520-526. The spectral image 504 therefore has fewer pixels than the spectral image 404, and lower spatial resolution. A spectral resolution of each pixel of the image 504, however, is in general greater than a spectral resolution of each pixel of the image 404 since a greater number of detectors provide data pertaining to each field of view in the array 502.

Figure 6:
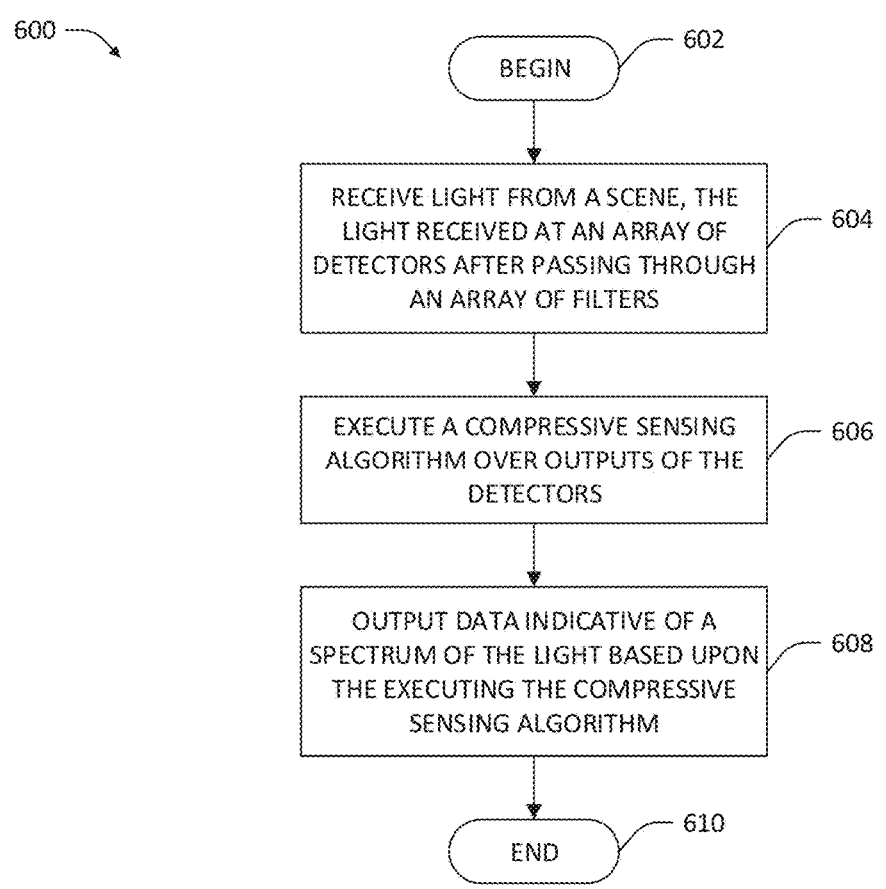
FIG. 6 is a flow diagram that illustrates an exemplary methodology that facilitates snapshot compressive sensing spectrometry.

FIG. 6 illustrates an exemplary methodology relating to compressive sensing snapshot spectrometry. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 that facilitates compressive sensing snapshot spectrometry is illustrated. The methodology 600 begins at 602, and at 604 light is received from a scene at an array of optical detectors after passing through an array of filters, wherein the light is focused at the detectors by way of an optical objective. Each detector in the array of detectors is configured to receive light from a different respective filter in the array of filters. By way of example, a first detector in the array of detectors receives light that passes through a first filter in the array of filters, a second detector receives light that passes through a second filter, a third detector receives light that passes through a third filter, etc. Each filter in the array of filters has a spectral transmittance function that overlaps with a spectral transmittance function of at least one other filter in the array of filters. In other words, each filter passes at least some of the same wavelengths of light as at least one of the other filters. At 606, a compressive sensing algorithm is executed over outputs of the detectors, or over data indicative of the outputs of the detectors. The output of each detector in the array of detectors is indicative of an intensity of light incident upon the surface of the detector, wherein the light incident upon the surface of each detector is filtered light received from the detector's corresponding filter in the array of filters. The compressive sensing algorithm identifies an intensity value of the light received by way of the objective for each of a plurality of spectral bins. In an exemplary embodiment, the compressive sensing algorithm identifies an intensity value of the light for a number of spectral bins greater than a number of detectors in the array of detectors. At 608 data indicative of a spectrum of the light received by way of the objective is output based upon the executing of the compressive sensing algorithm. In an embodiment, the data indicative of the spectrum of the light comprises the intensity values of the light for the number of spectral bins as identified by the execution of the compressive sensing algorithm. The methodology 600 completes at 610.

Referring now to FIG. 7, a high-level illustration of an exemplary computing device 700 that can be used in accordance with the systems and methodologies disclosed herein is illustrated. For instance, the computing device 700 may be used in a system that performs compressive sensing processing over optical detector output data to generate spectral images of a scene. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store optical detector output data, spectral data, etc.

The computing device 700 additionally includes a data store 708 that is accessible by the processor 702 by way of the system bus 706. The data store 708 may include executable instructions, optical detector output data, spectral data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   an optical objective;
   an array of optical filters, the array of filters configured to receive light from the objective, each filter in the array of filters having a same field of view, wherein each filter in the array of filters has a different spectral transmittance, wherein further the spectral transmittance of each filter overlaps a spectral transmittance of at least one other filter in the array of filters;

an array of optical detectors, each detector in the array of detectors configured to receive light from a different respective filter in the array of filters; and a computing system that receives data indicative of outputs of the detectors, the computing system configured to output data indicative of a spectrum of the light based upon the outputs of the detectors.

2. The system of claim 1, wherein the spectral transmittance of the filters is configurable responsive to a control signal.

3. The system of claim 2, wherein filters in the array of filters comprise liquid crystal phase retarders.

4. The system of claim 2, wherein the filters in the array of filters comprise Fabry-Perot filters.

5. The system of claim 1, the filters in the array of filters comprising a form birefringent material.

6. The system of claim 1, the computing system configured to output the data indicative of the spectrum of the light based upon execution of compressive sensing algorithms over the outputs of the detectors.

7. The system of claim 1, the computing system configured to output the data indicative of the spectrum of the light based further upon the spectral transmittances of the filters in the array of filters.

8. The system of claim 1, further comprising:
a second array of optical filters, the filters in the second array of filters having a same second field of view, each filter in the second array of filters having a different spectral transmittance, wherein further the spectral transmittance of each filter overlaps a spectral transmittance of at least one other filter in the second array of filters; and a second array of optical detectors, each detector in the second array of detectors configured to receive light from a different respective filter in the second array of filters;

wherein the computing system receives data indicative of outputs of the second detectors, the computing system configured to output the data indicative of the spectrum of the light based further upon the outputs of the second detectors.

9. The system of claim 8, wherein the first filter array and the first detector array correspond to a first field of view and the second filter array and the second detector array correspond to a second field of view.

10. The system of claim 9, wherein the computing system outputs data indicative of a first spectrum corresponding to the first field of view and a second spectrum corresponding to the second field of view.

11. The system of claim 10, wherein the data indicative of the spectrum of the light comprises a spectral image, a first pixel in the spectral image comprising the first spectrum, a second pixel in the spectral image comprising the second spectrum.

12. The system of claim 9, wherein filters at corresponding locations in the first array of filters and the second array of filters have a same spectral transmittance.

13. A method, comprising:
receiving light from a scene by way of an optical objective, the objective configured to focus the light at an array of optical detectors, wherein the light strikes the detectors after passing through an array of optical filters, each detector in the array of detectors configured to receive the light from a different filter in the array of filters, each filter in the array of filters having a spectral transmittance function that overlaps a spectral transmittance function of at least one other filter in the array of filters;

executing a compressive sensing algorithm over outputs of the detectors, the output of each detector indicative of an intensity of the light incident upon the respective detector; and outputting data indicative of a spectrum of the light based upon the executing the compressive sensing algorithm.

14. The method of claim 13, wherein the data indicative of the spectrum of the light comprises an intensity value of the light for each of a plurality of spectral bins.

15. The method of claim 14, wherein the plurality of spectral bins comprises a greater number of spectral bins than a number of detectors in the array of detectors.

16. The method of claim 13, the data indicative of a spectrum of the light comprising a spectral image, the detectors and the filters arranged in a plurality of groups, wherein detectors and filters of a same group correspond to a same pixel of the spectral image.

17. The method of claim 16, wherein spectral transmittance functions of filters of a first group are the same as filters at corresponding locations in a second group.

18. A system for compressive sensing snapshot spectrometry, comprising:
an optical objective that receives and focuses light from a scene;

an array of filters that receives the light from the optical objective, each filter in the array of filters having a spectral transmittance function that overlaps a spectral transmittance function of at least one other filter in the array of filters;

an array of optical detectors that receives filtered light, wherein each detector in the array of detectors receives filtered light from a different respective filter in the array of filters, wherein an output of a detector in the detectors is indicative of an intensity of the filtered light incident on the detector; and a computing system that executes a compressive sensing algorithm over values of outputs of the detectors, the computing system configured to generate a spectral image of the scene based upon executing the compressive sensing algorithm over the values of the outputs of the detectors.

19. The system of claim 18, the array of filters and the array of detector arranged in a plurality of corresponding groups, wherein each corresponding group of filters and detectors corresponds to a different respective pixel in the spectral image.

20. The system of claim 19, each pixel in the spectral image comprising spectral data for a greater number of spectral bins than a number of detectors in a respective corresponding group of detectors.

* * * * *